United States Patent
Mishra et al.

(10) Patent No.: US 11,575,513 B2
(45) Date of Patent: Feb. 7, 2023

(54) APPLYING ATTESTATION TOKENS TO MULTICAST ROUTING PROTOCOLS

(71) Applicant: Cisco Technology, Inc., San Jose, CA (US)

(72) Inventors: Mankamana Prasad Mishra, Dublin, CA (US); Ketan Jivan Talaulikar, Pune (IN); Sameer Ranjit Gulrajani, Fremont, CA (US); Swadesh Agrawal, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 223 days.

(21) Appl. No.: 16/867,795

(22) Filed: May 6, 2020

(65) Prior Publication Data

US 2021/0328794 A1 Oct. 21, 2021

(51) Int. Cl.
*H04L 9/32* (2006.01)
*H04L 45/16* (2022.01)

(52) U.S. Cl.
CPC ............ *H04L 9/3213* (2013.01); *H04L 45/16* (2013.01)

(58) Field of Classification Search
CPC ..... H04L 9/3213; H04L 45/16; H04L 63/105; H04L 63/0853; H04L 9/3234; H04L 63/102; G06F 21/37; H04W 12/06
See application file for complete search history.

(56) References Cited

U.S. PATENT DOCUMENTS

| | | | |
|---|---|---|---|
| 8,117,459 B2 * | 2/2012 | Cameron | G06F 21/33 709/228 |
| 2011/0044348 A1 * | 2/2011 | Kini | H04L 45/507 370/401 |
| 2011/0173105 A1 * | 7/2011 | Schirilla | H04L 63/08 713/176 |
| 2013/0301470 A1 * | 11/2013 | Thubert | H04L 45/18 370/254 |
| 2015/0134965 A1 * | 5/2015 | Morenius | G06F 9/45533 713/172 |
| 2016/0125180 A1 * | 5/2016 | Smith | H04L 9/0822 726/20 |
| 2018/0295131 A1 * | 10/2018 | Zhang | H04L 63/0807 |
| 2020/0322150 A1 * | 10/2020 | Psenak | H04L 45/02 |
| 2020/0322353 A1 * | 10/2020 | Bhandari | H04L 63/1425 |
| 2020/0322383 A1 * | 10/2020 | Filsfils | H04L 45/12 |

* cited by examiner

*Primary Examiner* — Abu S Sholeman
(74) *Attorney, Agent, or Firm* — Baker Botts L.L.P.

(57) ABSTRACT

In one embodiment, method includes receiving, by a first network apparatus, a first multicast message from a second network apparatus. The first multicast message includes attestation-capability information associated with the second network apparatus and an attestation token. The attestation token is for proving that the second network apparatus is in a known safe state. The method also includes determining, by the first network apparatus, that the attestation-capability information satisfies a pre-determined attestation capability requirement and determining, by the first network apparatus, that the attestation token is valid for the second network apparatus at a current time. The method further includes establishing, by the first network apparatus, an adjacency to the second network apparatus.

20 Claims, 6 Drawing Sheets

| TLV-Type | To be allocated by IANA |
|---|---|
| Length | Variable |
| Value | Structured information including the attestation parameters and token |

*FIG. 3A*

| TLV-Type | To be allocated by IANA |
|---|---|
| Length | Variable |
| Value | Security Level (1 byte) |

*FIG. 3B*

| TLV-Type | To be allocated by IANA |
|---|---|
| Length | Variable |
| Value | Structured information about attestation procedures supported by the node |

APPLYING ATTESTATION TOKENS TO MULTICAST ROUTING PROTOCOLS

TECHNICAL FIELD

The present disclosure relates generally to a field of data communications, and more specifically to systems and methods for applying attestation tokens to multicast routing protocols.

BACKGROUND

Multicast may be used to communicate sensitive information over a network. Multicast protocols such as Protocol-Independent Multicast (PIM) and Multicast Label Distribution Protocol (MLDP) are used to build multicast forwarding trees. If an attacker gains access to the multicast network and joins the multicast tree, traditional protections such as link encryption may prove ineffectual. The attacker may compromise one or more nodes within the multicast tree, which can lead to tampering and/or leaking of the sensitive information.

BRIEF DESCRIPTION OF THE DRAWINGS

FIG. 3A illustrates an example format for Attestation Type-Length-Value (TLV);

FIG. 3B illustrates an example format for Security-Level Sub-TLV;

FIG. 3C illustrates an example format for Attestation-Capability TLV;

DESCRIPTION OF EXAMPLE EMBODIMENTS

Overview

Figure 1:
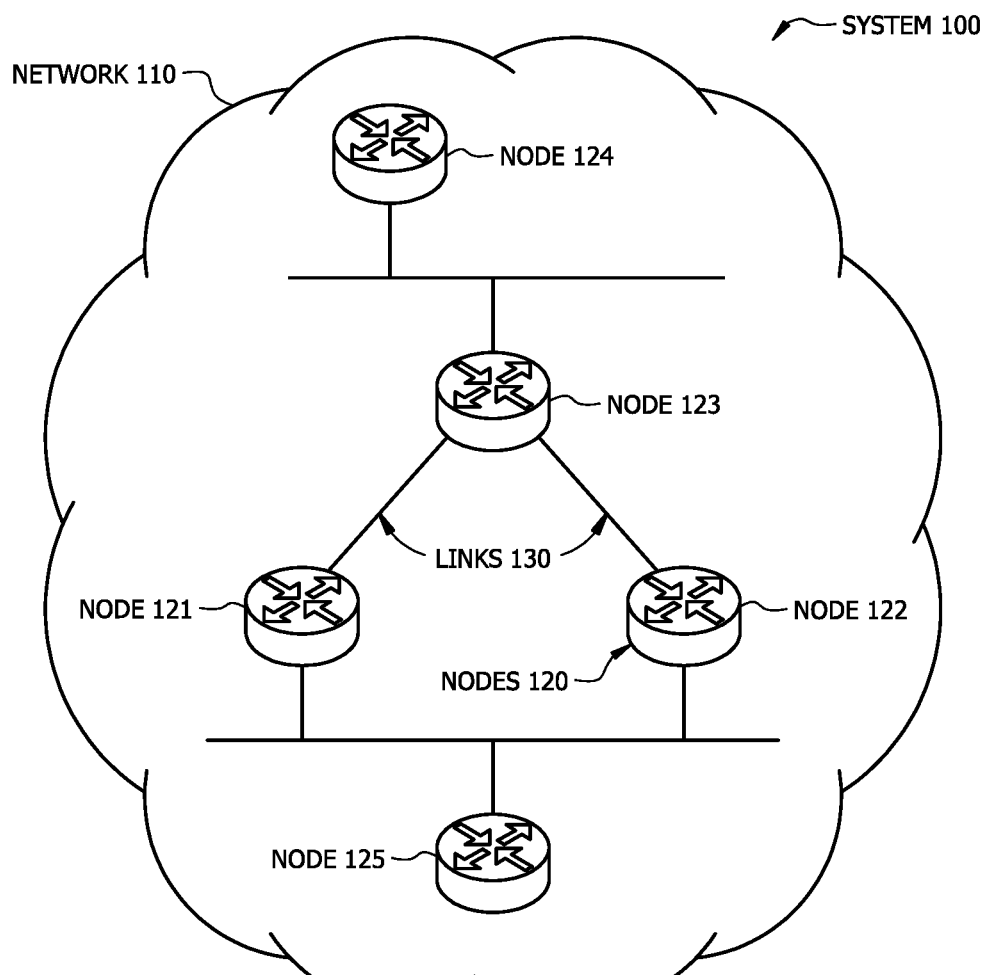
FIG. 1 illustrates a schematic representation of a network supporting a trusted multicast routing protocol.

According to an embodiment, a first network apparatus includes one or more processors and one or more computer-readable non-transitory storage media coupled to the one or more processors. The one or more computer-readable non-transitory storage media include instructions that, when executed by the one or more processors, cause the first network apparatus to perform operations including receiving, from a second network apparatus, a first multicast message. The first multicast message includes attestation-capability information associated with the second network apparatus and an attestation token. The attestation token is for proving that the second network apparatus is in a known safe state. The operations also include determining that the attestation-capability information satisfies a pre-determined attestation capability requirement and determining that the attestation token is valid for the second network apparatus at a current time. The operations further include establishing an adjacency to the second network apparatus.

In some embodiments, the first multicast message is a PIM hello message or an LDP message. In certain embodiments, determining that the attestation token is valid for the second network apparatus at the current time includes forwarding the attestation token and an identity of the second network apparatus to a third-party verifier and receiving a response that includes a confirmation that the attestation token is valid for the second network apparatus at the current time. The third-party verifier may be determined to be trustworthy.

In certain embodiments, the operations include receiving, from a third network apparatus, a second multicast message that includes attestation-capability information associated with the third network apparatus, determining that the attestation-capability information fails to satisfy the pre-determined attestation capability requirement, and dropping any multicast message originated from the third network apparatus. In some embodiments, the operations include determining that a security level associated with the second network apparatus satisfies a pre-determined security level threshold. The first multicast message may include the security level.

In certain embodiments, the operations include receiving, from a third network apparatus, a second multicast message that includes a second attestation token, determining that the second attestation token is invalid for the third network apparatus at a current time, and processing the second multicast message based on a local policy. The second attestation token may be for proving that the third network apparatus is in a known safe state. In some embodiments, the local policy may instruct the first network apparatus to drop the second multicast message if the second attestation token is invalid for the third network apparatus at the current time.

According to another embodiment, a method includes receiving, by a first network apparatus, a first multicast message from a second network apparatus. The first multicast message includes attestation-capability information associated with the second network apparatus and an attestation token. The attestation token is for proving that the second network apparatus is in a known safe state. The method also includes determining, by the first network apparatus, that the attestation-capability information satisfies a pre-determined attestation capability requirement and determining, by the first network apparatus, that the attestation token is valid for the second network apparatus at a current time. The method further includes establishing, by the first network apparatus, an adjacency to the second network apparatus.

According to yet another embodiment, one or more computer-readable non-transitory storage media embody instructions that, when executed by a processor, cause the processor to perform operations including receiving, by a first network apparatus, a first multicast message from a second network apparatus. The first multicast message includes attestation-capability information associated with the second network apparatus and an attestation token. The attestation token is for proving that the second network apparatus is in a known safe state. The operations also include determining, by the first network apparatus, that the attestation-capability information satisfies a pre-determined attestation capability requirement and determining, by the first network apparatus, that the attestation token is valid for the second network apparatus at a current time. The operations further include establishing, by the first network apparatus, an adjacency to the second network apparatus.

Technical advantages of certain embodiments of this disclosure may include one or more of the following. Certain systems and methods described herein apply attestation tokens and/or security levels to multicast routing protocols such as PIM and MLDP. The attestation tokens and/or security levels may be used to achieve trust for secured multicast flows. Certain embodiments of this disclosure ensure that traffic for secured multicast flows is diverted through trusted network components (e.g., routers) in multicast network topologies. The remaining traffic may still use bandwidth available through unsecured network components. Particular embodiments of this disclosure provide systems and methods for attesting authenticity and allowing a common attestation framework to be applied across existing networking hardware as well as virtual routers. Particular embodiments of this disclosure include systems and methods for defining requirements for placing different types of signed measurements (e.g., tokens or stamps) while allowing receivers to evaluate potential trustworthiness of attested information.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

A network may only be as secure as its weakest links. Information sent from a first device to a second device on the network may pass through multiple intermediary nodes or devices (e.g., routers, network controllers, etc.) before it reaches the target device. It is vitally important that the information, especially when it includes sensitive material, should not be sent through compromised nodes (e.g., hacked or captured nodes) to prevent leakage of or tampering with the sensitive information. However, as network size and complexity increase, the potential number of attack vectors for an attacker to exploit also grows. It may be difficult to determine with certainty whether each individual node through which an arbitrary piece of information may pass is secured without having a dramatic effect on the performance of the network. Moreover, if an attacker gains root access to a device (e.g., via some previously undetected exploit), traditional protections and link (e.g., in-transit) encryption may prove ineffectual at protecting any sensitive information.

Figure 2A:
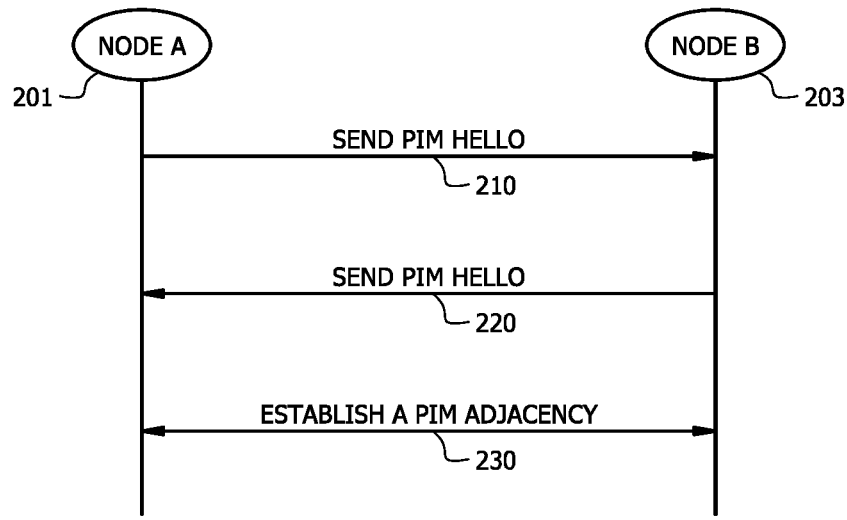
FIG. 2A illustrates example message sequences for establishing an adjacency in a network supporting a trusted PIM routing protocol.
Figure 2B:
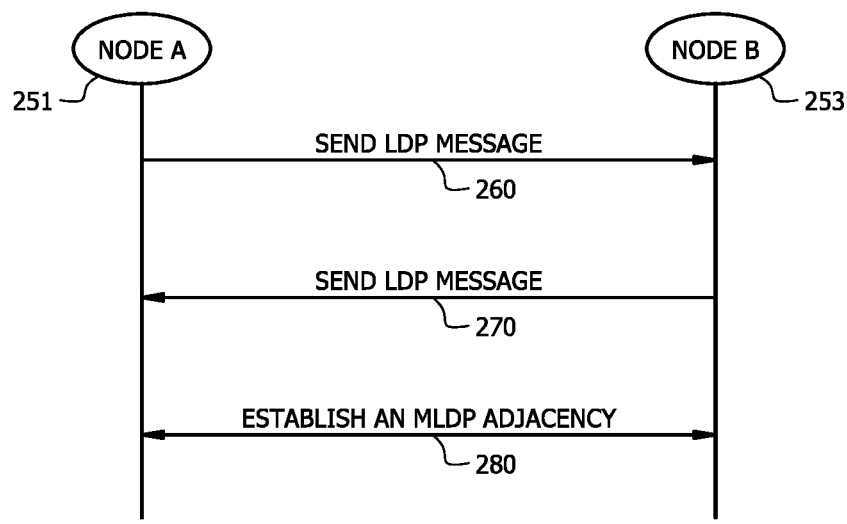
FIG. 2B illustrates example message sequences for establishing an adjacency in a network supporting a trusted MLDP routing protocol.
Figure 4A:
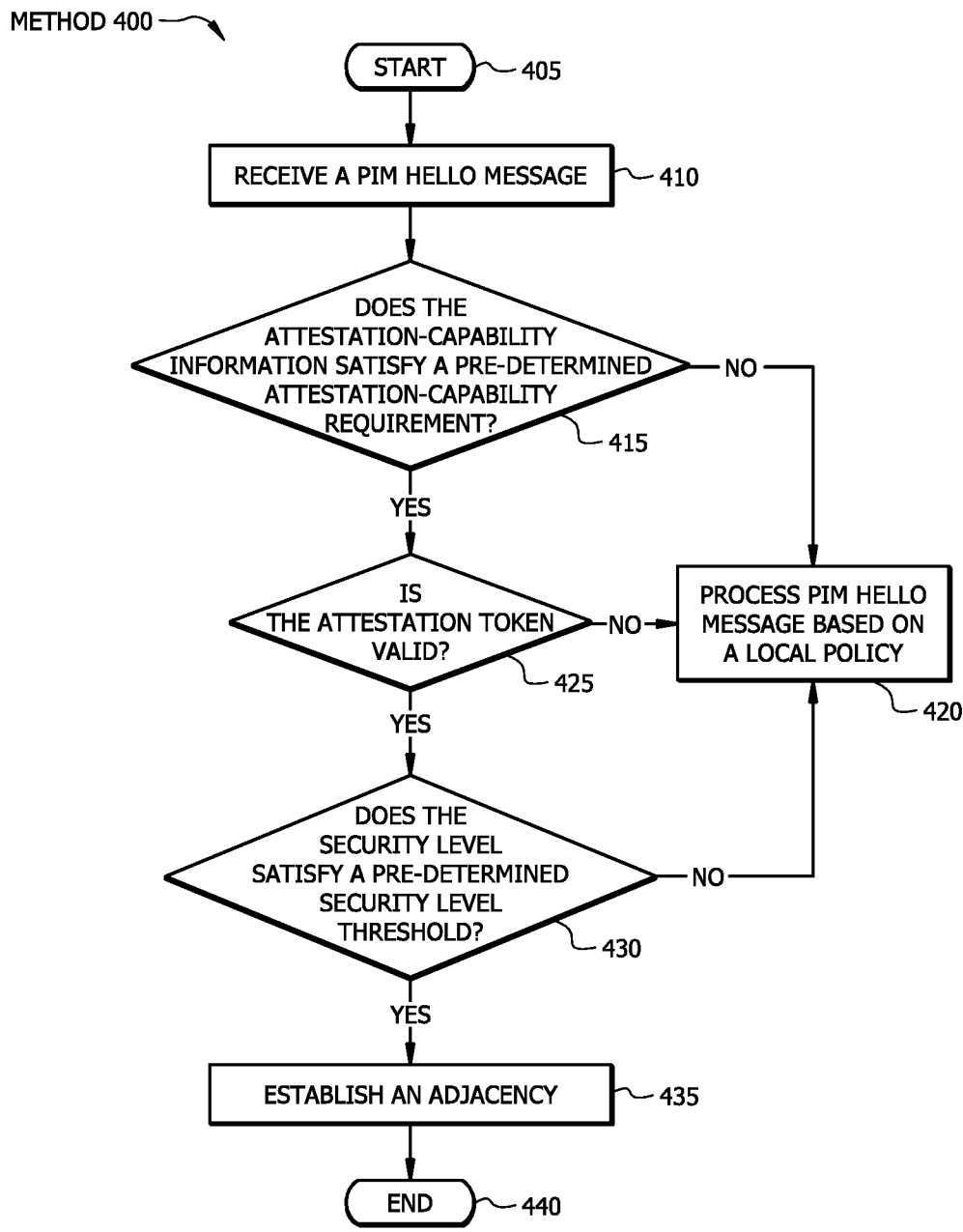
FIG. 4A illustrates an example method for validating a node with an attestation token in a network supporting a trusted PIM routing protocol.
Figure 4B:
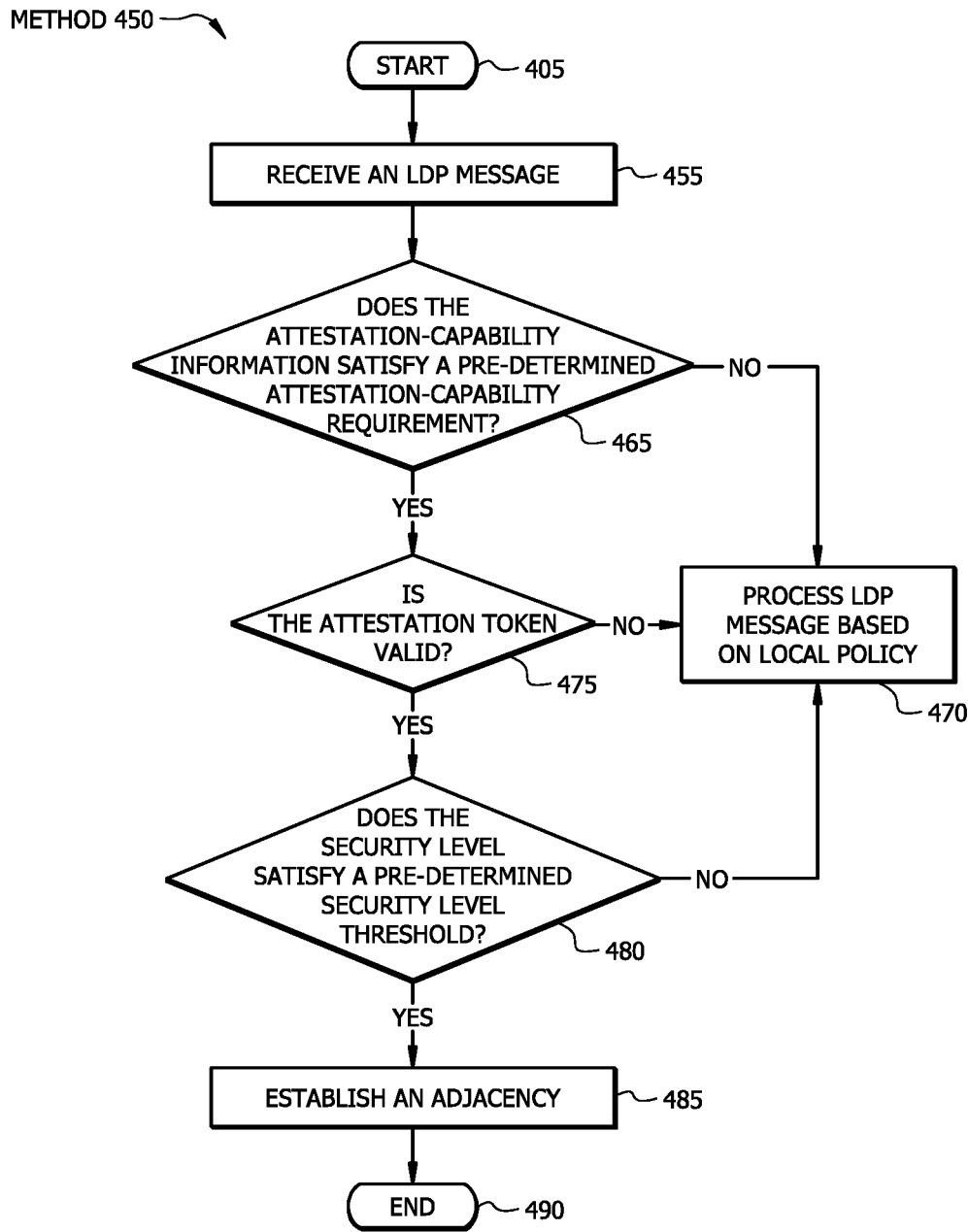
FIG. 4B illustrates an example method for validating a node with an attestation token in a network supporting a trusted MLDP routing protocol.
Figure 5:
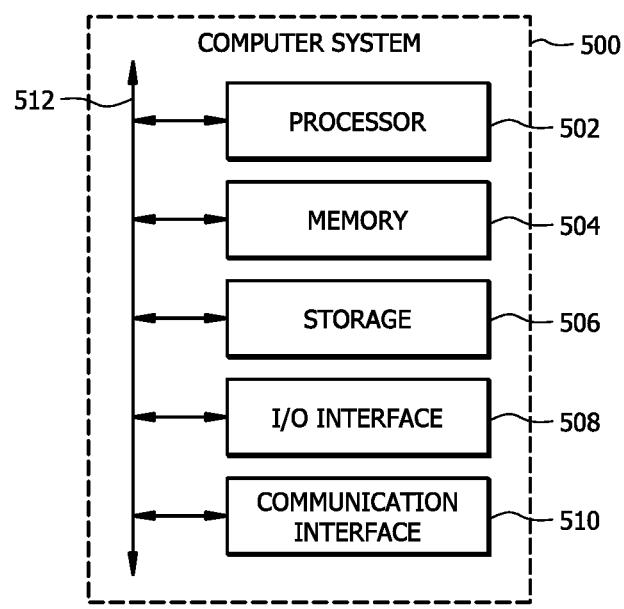
FIG. 5 illustrates an example computer system that may be used by the systems and methods described herein.

This disclosure describes systems and methods for validating network components by utilizing attestation tokens in multicast routing protocols. FIG. 1 shows an example system for a network supporting a trusted multicast routing protocol. FIG. 2A shows example message sequences for establishing an adjacency in a network supporting a trusted PIM routing protocol, and FIG. 2B shows example message sequences for establishing an adjacency in a network supporting a trusted MLDP routing protocol. FIG. 3A shows an example format for Attestation Type-Length-Value (TLV), FIG. 3B shows an example format for Security-Level Sub-TLV, and FIG. 3C shows an example format for Attestation-Capability TLV. FIG. 4A shows an example method for validating a node with an attestation token in a network supporting a trusted PIM routing protocol, and FIG. 4B shows an example method for validating a node with an attestation token in a network supporting a trusted MLDP routing protocol. FIG. 5 shows an example computer system that may be used by the systems and methods described herein.

FIG. 1 illustrates an example system 100 for a network 110 supporting a trusted multicast routing protocol. System 100 or portions thereof may be associated with an entity, which may include any entity, such as a business or company that applies attestation tokens to multicast routing protocols. The components of system 100 may include any suitable combination of hardware, firmware, and software. For example, the components of system 100 may use one or more elements of the computer system of FIG. 5. System 100 of FIG. 1 includes network 110, nodes 120, and links 130.

Network 110 of system 100 is any type of network that facilitates communication between components of system 100. Network 110 may connect one or more components of system 100. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. Network 110 may use Multiprotocol Label Switching (MPLS) or any other suitable routing technique. One or more components of system 100 may communicate over network 110. Network 110 may include a core network (e.g., the Internet), an access network of a service provider, an internet service provider (ISP) network, and the like.

In the illustrated embodiment of FIG. 1, network 110 is an Internet Protocol (IP) multicast network. IP multicast is a bandwidth-conserving technology that reduces traffic by simultaneously delivering a single stream of information to potentially thousands of nodes 120. Applications that take advantage of multicast may include video conferencing, corporate communications, distance learning, distribution of software, distribution of stock quotes, distribution of news, and the like. Network 110 may deliver application source traffic to multiple nodes 120 (e.g., receivers) without burdening the source or nodes 120. In certain embodiments, multicast packets are replicated in network 110 at the point where paths diverge by nodes 120 (e.g., routers) enabled with one or more multicast protocols. Nodes 120 may use a multicast protocol to dynamically create a multicast distribution tree. Multicast protocols may include PIM, LDP, MLDP, Internet Group Management Protocol (IGMP), Distance Vector Multicast Routing Protocol (DVMRP), Multicast Open Shortest Path First (MOSPF), Multicast BGP (MBGP), Multicast Source Discovery Protocol (MSDP), Multicast Listener Discovery (MLD), Gratuitous Address Resolution Protocol (GARP) Multicast Registration Protocol (GMRP), Shortest Path Bridging (SPB), and the like.

Nodes 120 of system 100 are connection points within network 110 that receive, create, store and/or send traffic along a path. Nodes 120 may include one or more endpoints and/or one or more redistribution points that recognize, process, and forward traffic to second nodes 120. Nodes 120 may include virtual and/or physical nodes. In certain embodiments, one or more nodes 120 include data equipment such as routers, servers, switches, bridges, modems, hubs, printers, workstations, and the like. Nodes 120 of system 100 include node 121, node 122, node 123, node 124, and node 125. Links 130 of system 100 are connections between nodes 120 of network 110. Links 130 provide for communication between nodes 120 of network 110.

In certain embodiments, attestation may be applied in the context of security management at a network-level to determine in real-time whether one or more nodes 120 of network 110 should be trusted. Certain embodiments of this disclosure introduce an asynchronous, time-based variant of attestation that may allow one or more nodes 120 in network 110 to reliably ascertain if a source that is routing information has been compromised. The token used in this variant of attestation may be referred to as a "canary stamp" since it positively marks data as it transitions through network 110. The attestation token may indicate on a front-line basis whether any security problems exist within network 110.

In particular embodiments, system 100 may use attestation tokens to build a trusted network topology based on a multicast protocol. As an example and not by way of limitation, one or more nodes 120 with attestation capability of advertisement may advertise their support for attestation procedures in PIM or MLDP. One or more nodes 120 may advertise an Attestation Type-Length-Value (TLV) including the information provided by the local node's trusted computing infrastructure in every advertisement that it originates. This may allow a particular node 120 (e.g., node 125) to detect the trustworthiness of its adjacency with its neighboring node 120 (e.g., node 122). One or more nodes 120 may validate the Attestation TLV received in messages using the local node's trusted computing infrastructure. The validation may be done during initial bring-up as well as periodically as determined by local policy. Based on the local attestation policy (and/or secure interactions with an external agent/controller), one of the following actions may be performed if this validation fails: (1) Do not include the neighbor's address in the messages. This may result in adjacency bring-up not proceeding further and the adjacency remaining stuck in Initial state. It may also bring down an already established adjacency. (2) Set the metric of links 130 associated with compromised nodes 120 to a maximum value. This may avoid traffic transiting via compromised/unsecure nodes 120 unless as a last resort. (3) Bring-up and continue to keep the adjacency as normal. Each Attestation TLV advertised in a multicast message may include one or more of the following: (1) attestation-capability information, (2) an attestation token, and/or (3) a security level.

One or more first nodes 120 of network 110 may determine whether the attestation-capability information associated with one or more second nodes 120 of network 110 satisfy a pre-determined attestation capability requirement based on the attestation-capability information. Attestation-capability information is any information that indicates whether a particular node 120 is capable of supporting attestation procedures in a multicast routing protocol (e.g., a PIM or an MLDP routing protocol). In particular embodiments, a first node 120 of network may process a multicast message received from a second node 120 of network 110 based on a local policy if the attestation capability associated with second node 120 satisfies the pre-determined attestation capability requirement. In particular embodiments, the attestation capability associated with second node 120 may not satisfy the pre-determined attestation capability requirement. In such a case, first node 120 may process the multicast message based on a local policy. As an example and not by way of limitation, first node 120 may drop any multicast messages from nodes 120 whose attestation capabilities do not satisfy the pre-determined attestation capability requirement. In certain embodiments, the attestation-capability information is provided in an Attestation TLV of a message received from second node 120.

One or more nodes 120 of network 110 may determine whether the attestation token associated with one or more second nodes 120 of network 110 is valid. In particular embodiments, first node 120 of network 110 may receive a multicast message that includes an attestation token from second node 120. The attestation token may be for proving that second node 120 is in a known safe state. In particular embodiments, one or more nodes 120 of network may generate an attestation token using one or more cryptoprocessors associated with one or more nodes 120. The attestation token may be valid for a pre-determined amount of time. One or more nodes 120 may re-generate an attestation token when a previous attestation token expires.

In certain embodiments, the attestation token is provided in the Attestation TLV of the message received from second node 120. First node 120 may determine that the attestation token is invalid for second node 120 at a current time. First node 120 may process the multicast message based on a local policy if the attestation token is determined to fail to be valid for second node 120 at the current time. For example, first node 120 may drop the message based on the local policy if first node 120 determines that the attestation token is invalid for second node 120 at the current time. As another example, the local policy may instruct first node 120 to exclude any node 120 that fails to provide a valid attestation token from network 110.

In particular embodiments, one or more nodes 120 of network 110 may determine that an attestation token is valid for one or more second nodes 120 at a current time. To determine that the attestation token is valid, the first node 120 may forward the attestation token and an identity of second node 120 (and any attestation parameters needed for a verification) to a third-party verifier. The third-party verifier may be determined to be trustworthy in network 110. First node 120 may receive a response including a confirmation that the attestation token is valid for the second node 120 at the current time. Once first node 120 receives the confirmation from the verifier, first node 120 may be able to verify one or more following attestation tokens from second node 120 without communicating with the verifier.

In certain embodiments, first node 120 of network 110 may compute a trust level for link 130 from first node 120 to second node 120 based at least on the attestation token. As an example and not by way of limitation, first node 120 may set a maximum value to the trust level for link 130 if first node 120 determines that the attestation token for second node 120 is valid at the current time. As another example and not by way of limitation, first node 120 may set a minimum value to the trust level for link 130 if second node 120 determines that the attestation token for second node 120 is not valid at the current time. As yet another example and not by way of limitation, first node 120 may determine a value of the trust level for link 130 based on the attestation token and any other suitable parameters for the trust level for link 130.

One or more nodes 120 of network 110 may determine whether a security level associated with one or more second nodes 120 of network 110 satisfies a pre-determined security level threshold. The security level represents the minimal trustworthiness level associated with a particular node 120 and/or link 130. In particular embodiments, one or more nodes 120 may be configured to advertise the security level of one or more nodes 120, links 130, or adjacencies using a Security-Level Sub-TLV. The Security-Level Sub-TLV may include information that indicates a trustworthiness associated with a particular node 120 or link 130. In particular embodiments, one or more nodes 120 of network 110 may compare the security level of one or more nodes 120 or links 130 in a trusted network topology to a threshold degree of trust. If the security level of a first node 120 or link 130 is equal to or greater than the threshold degree of trust, that first node 120 or link 130 is determined to be trustworthy.

In particular embodiments, nodes 120 of a network 110 supporting a trusted multicast routing protocol may be configured to advertise their attestation capabilities. Through this function, each node 120 may be capable of positively announcing to second nodes 120 of network 110 along links 130 that it is capable of supporting attestation procedures (e.g., canary stamps) in the multicast routing protocol. In some embodiments, each node 120 may announce particular functions that it supports or variants of attestation capabilities.

In particular embodiments, one or more nodes 120 of network 110 may be configured to advertise an Attestation TLV. Node 120 may include a trusted computing infrastructure (e.g., a trusted platform module or other crypto-processor) and may append information provided by the trusted computing infrastructure to advertisements it sends through an Attestation TLV. The Attestation TLV may be appended to one or more advertisements originating in a device that supports the trusted multicast routing procedure.

In particular embodiments, one or more nodes 120 of network 110 may be configured to advertise an Attestation TLV to neighboring nodes 120 in network 110, e.g., through a multicast Protocol Data Unit (PDU). For example, node 125 may be configured to send multicast Hello PDUs to node 121 and node 122 along links 130. One or more nodes 120 may be configured to append information provided by its trusted computing architecture to multicast PDUs issued by the node as, e.g., an Attestation TLV. A so-modified multicast PDU may allow nodes 120 that receive the multicast PDU to determine the trustworthiness of the multicast PDU, as well as the trustworthiness of the adjacency implied by the issuance of a multicast PDU. Devices in the multicast routing protocol may be configured to ignore TLVs that they cannot process, so the addition of an Attestation TLV to the multicast PDU may not impact devices that do not support attestation.

In particular embodiments, one or more nodes 120 of network 110 may be configured to validate Attestation TLVs received from multicast PDUs from other nodes 120. One or more nodes 120 may be further configured to act based on the status of the validation according to a specified policy provided to nodes 120. For example, if the validation fails, a first node 120 may effectively ignore the multicast PDU. One or more nodes may refuse to acknowledge the adjacency match. As another example, if the validation fails, one or more nodes 120 may be configured to set a specified metric of the connection to a maximum value. As another example, if the validation fails, one or more nodes 120 may approve the adjacency match.

In certain embodiments, network 110 of system 100 utilizes equal-cost multi-path routing (ECMP). ECMP is a routing strategy where next-hop packet forwarding to a single destination can occur over multiple "best paths" which tie for top place in routing metric calculations. In the case of ECMP, as an example and not by way of limitation, node 125 of network 110 may discover that nodes 121 and node 122 are ECMP Reverse Path Forwarding (RPF) neighbors toward node 124. In this instance, node 125 communicates a join message to its RPF neighbor from which it has received a multicast message with a trusted attestation token. In the case of non-ECMP situations, as by example and not by way of limitation, node 125 may only discover node 121 as an RPF neighbor. Even though node 121 may not be a trusted peer, node 125 may only have the option to communicate a join message to node 121. However, when node 122 discovers the join message is being directed to a non-trusted neighbor, node 122 may force a PIM assert message to take on the role of assert winner. This process may only be performed for secured multicast flows and may not be triggered for other multicast flows. When node 122 is elected as the assert winner for a secured multicast flow, node 125 automatically changes its RPF neighbor to node 122 for that flow, which ensures that all future multicast join messages are only communicated to node 122.

In operation, node 125 receives a first multicast message from node 121. The first multicast message includes attestation-capability information, an attestation token, and a security level associated with node 121. Node 125 makes the following determinations: the attestation-capability information satisfies a pre-determined attestation capability requirement; the attestation token is valid for node 121 at a current time; and a security level associated with node 121 satisfies a pre-determined security level threshold. In response to these determinations, node 125 establishes an adjacency to node 121, which allows node 121 to participate in multicast tree building. Node 125 receives a second multicast message (e.g., a PIM hello message or an LDP message) from node 122. The second multicast message includes attestation-capability information, an attestation token, and a security level associated with node 122. Node 125 makes at least one of the following determinations: the attestation-capability information fails a pre-determined attestation capability requirement; the attestation token fails validation for node 122 at a current time; and/or a security level associated with node 122 fails to satisfy a pre-determined security level threshold. In response to this determination, node 125 refuses to establish an adjacency to node 122, which prevents node 122 from participating in multicast tree building. Node 125 may log errors related to adjacency over a secure channel to an external agent/controller to take remedial action via policy enforcement or other steps. As such, system 100 may be used to achieve trust for secured multicast flows using existing multicast protocols.

Although FIG. 1 illustrates a particular arrangement of network 110, nodes 120, and links 130, this disclosure contemplates any suitable arrangement of network 110, nodes 120, and links 130. Although FIG. 1 illustrates a particular number of networks 110, nodes 120, and links 130, this disclosure contemplates any suitable number of networks 110, nodes 120, and links 130. For example, system 100 may include more or less than five nodes 120.

FIG. 2A illustrates example message sequences for establishing an adjacency in a network supporting a trusted PIM routing protocol. As illustrated in FIG. 2A, node A 201 and node B 203 are connected via a link. At the beginning, node A 201 and node B 203 may not be aware of each other. Node A 201 and node B 203 are configured to operate the PIM routing protocol. PIM is a family of multicast routing protocols for IP networks that provide one-to-many and many-to-many distribution of data over a LAN, WAN, or the Internet. PIM uses the unicast routing table for reverse path forwarding (RPF). Variants of PIM include the following: PIM sparse mode (PIM-SM), which explicitly builds unidirectional shared trees rooted at a rendezvous point (RP) per group and optionally creates shortest-path trees per source;

PIM dense mode (PIM-DM), which uses dense multicast routing and builds shortest-path trees; bidirectional PIM (Bidir-PIM), which builds shared bi-directional trees; and PIM source-specific multicast (PIM-SSM), which builds trees that are rooted in one source.

Because both node A 201 and node B 203 are configured to operate the PIM routing protocol, nodes 201 and 203 are sending PIM hello messages at a regular interval. The PIM hello messages may be used to discover neighbors on a link. Once the neighbors are discovered, the PIM hello messages may act as keepalive messages to maintain the adjacency. At step 210, node A 201 sends a PIM hello message over the link connected to node B 203. The PIM hello message at step 210 may be broadcast. The PIM hello message from node A 201 may not include the address of node B 203 in the active neighbor list. At step 220, node B 203 sends a PIM hello message over the link connected to node A 201. Because both node A 201 and node B 203 discover each other, both nodes may establish an adjacency at step 230 and send PIM hello messages periodically. The periodic hello messages may include each other's address in the active neighbor list. Node A 201 may receive a PIM hello message that includes attestation-capability information, an attestation token, and/or a security level from node B 203. The attestation-capability information, attestation token, and/or security level may be provided in the Attestation TLV of the PIM hello message. The attestation-capability information, attestation token, and/or security level may be used to establish or maintain an adjacency between Node A 201 and Node B 203.

Although FIG. 2A illustrates particular message sequences for establishing an adjacency in a network supporting a trusted PIM routing protocol, this disclosure contemplates any suitable message sequences for establishing an adjacency in a network supporting a trusted PIM routing protocol. Although FIG. 2A illustrates a particular number of message sequences, this disclosure contemplates any suitable number of message sequences.

FIG. 2B illustrates example message sequences for establishing an adjacency in a network supporting a trusted MLDP routing protocol. As illustrated in FIG. 2B, node A 251 and node B 253 are connected via a link. At the beginning, node A 251 and node B 253 may not be aware of each other. Node A 251 and node B 253 are configured to operate the MLDP routing protocol. MLDP provides extensions to the Label Distribution Protocol (LDP) for the setup of point-to-multipoint (P2MP) and multipoint-to-multipoint (MP2MP) Label Switched Paths (LSPs) in MPLS networks. LDP is a protocol in which nodes (e.g., routers) capable of MPLS exchange label mapping information. LDP is used to build and maintain LSP databases that are used to forward traffic through MPLS networks.

Because both node A 251 and node B 253 are configured to operate the MLDP routing protocol, nodes 251 and 253 are sending LDP messages to each other. The LDP messages may be used to discover neighbors on a link. Once the neighbors are discovered, the LDP messages may act as keepalive messages to maintain the adjacency. At step 260, node A 251 sends an LDP message over the link connected to node B 253. The LDP message from node A 251 may not include the address of node B 253 in the active neighbor list. At step 270, node B 253 sends an LDP message over the link connected to node A 251. Because both node A 251 and node B 253 discover each other, both nodes may establish an MLDP adjacency at step 280. In certain embodiments, the nodes may send LDP messages periodically. The periodic messages may include each other's address in the active neighbor list. Node A 251 may receive an LDP message that includes attestation-capability information, an attestation token, and/or a security level from node B 253. The attestation-capability information, attestation token, and/or security level may be provided in the Attestation TLV of the LDP message. The attestation-capability information, attestation token, and/or security level may be used to establish or maintain an adjacency between Node A 251 and Node B 253.

Although FIG. 2B illustrates particular message sequences for establishing an adjacency in a network supporting a trusted MLDP routing protocol, this disclosure contemplates any suitable message sequences for establishing an adjacency in a network supporting a trusted MLDP routing protocol. Although FIG. 2B illustrates a particular number of message sequences, this disclosure contemplates any suitable number of message sequences.

FIG. 3A illustrates an example format for Attestation TLV. The Attestation TLV may be a top-level multicast TLV in the hierarchy of TLVs. In certain embodiments, the TLV type is allocated by Internet Assigned Numbers Authority (IANA). The length of the TLV may be variable. The value of the TLV may include structured information including attestation parameters and an attestation token (e.g., a canary stamp) generated using a trusted platform module of a network node. The attestation token is for proving that a node is in a known safe state.

FIG. 3B illustrates an example format for Security-Level Sub-TLV. In certain embodiments, the TLV type is allocated by IANA. The length of the Security-Level Sub-TLV may be variable. The value of the Security-Level Sub-TLV may include the security level of an indicated link or prefixes. The security level represents the minimal trustworthiness level associated with a node and/or link.

FIG. 3C illustrates an example format for Attestation-Capability TLV. In certain embodiments, the TLV type is allocated by IANA. The length of the Attestation-Capability TLV may be variable. The value of the Attestation-Capability TLV may include structured information about the attestation capabilities supported by the originating node of the multicast message. Attestation-capability information is any information that indicates whether a particular node is capable of supporting attestation procedures in a multicast routing protocol (e.g., a PIM or an MLDP routing protocol).

FIG. 4A illustrates an example method 400 for validating a node with an attestation token in a network supporting a trusted PIM routing protocol. Method 400 begins at step 405. At step 410, a first node (e.g., node 125 of FIG. 1) of a multicast network (e.g., network 110 of FIG. 1) receives a PIM hello message from a second node (e.g., node 121 of FIG. 1) of the network. The PIM hello message may include one or more of the following: attestation-capability information, an attestation token, and a security level. Method 400 then moves from step 410 to step 415, where the first node determines whether the attestation-capability information satisfies a pre-determined attestation capability requirement. If the first node determines that the attestation-capability information does not satisfy the pre-determined attestation capability requirement (or if the PIM hello message does not include attestation-capability information), method 400 moves from step 415 to step 420, where the first node processes the PIM hello message based on a local policy. For example, the local policy may instruct the first node to drop the PIM hello message if the attestation-capability information fails to satisfy the pre-determined attestation capability requirement. Method 400 then moves from step 420 to step 440, where method 400 ends.

If, at step 415, the first node determines that the attestation-capability information satisfies the pre-determined attestation capability requirement, method 400 moves from step 415 to step 425, where the first node determines whether the attestation token is valid for the second node at a current time. If the first node determines that the attestation token is not valid for the second node (or if the PIM hello message does not include an attestation token), method 400 moves from step 425 back to step 420, where the first node processes the PIM hello message based on a local policy. For example, the local policy may instruct the first node to drop the PIM hello message if the second attestation token is invalid for the second node at the current time. Method 400 then moves from step 420 to step 440, where method 400 ends.

If, at step 425, the first node determines that the attestation token is valid for the second node, method 400 moves from step 425 to step 430, where the first node determines whether a security level received from the second node satisfies a predetermined threshold. If the first node determines that the security level does not satisfy the predetermined threshold (or if the PIM hello message does not include a security level), method 400 moves from step 425 back to step 420, where the first node processes the PIM hello message based on a local policy. For example, the local policy may instruct the first node to drop the PIM hello message if the security level does not satisfy the predetermined threshold. Method 400 then moves from step 420 to step 440, where method 400 ends.

If, at step 430, the first node determines that the security level satisfies the predetermined threshold, method 400 moves from step 430 to step 435, where the first node establishes an adjacency to the second node. Once adjacency is established, the second node becomes part of the multicast tree. Method 400 then moves from step 435 to step 440, where method 400 ends. Particular embodiments may repeat one or more steps of the method of FIG. 4, where appropriate.

Although this disclosure describes and illustrates particular steps of the method of FIG. 4A as occurring in a particular order, this disclosure contemplates any suitable steps of the method of FIG. 4A occurring in any suitable order. Moreover, although this disclosure describes and illustrates an example method for validating a node with an attestation token in a network supporting a trusted PIM routing protocol including the particular steps of the method of FIG. 4A, this disclosure contemplates any suitable method for validating a node with an attestation token in a network supporting a trusted PIM routing protocol including any suitable steps, which may include all, some, or none of the steps of the method of FIG. 4A, where appropriate. Furthermore, although this disclosure describes and illustrates particular components, devices, or systems carrying out particular steps of the method of FIG. 4A, this disclosure contemplates any suitable combination of any suitable components, devices, or systems carrying out any suitable steps of the method of FIG. 4A.

FIG. 4B illustrates an example method 450 for validating a node with an attestation token in a network supporting a trusted MLDP routing protocol. Method 450 begins at step 455. At step 460, a first node (e.g., node 125 of FIG. 1) of a multicast network (e.g., network 110 of FIG. 1) receives an LDP message from a second node (e.g., node 121 of FIG. 1) of the network. The LDP message may include one or more of the following: attestation-capability information, an attestation token, and a security level. Method 400 then moves from step 460 to step 465, where the first node determines whether the attestation-capability information satisfies a pre-determined attestation capability requirement. If the first node determines that the attestation-capability information does not satisfy the pre-determined attestation capability requirement (or if the LDP message does not include attestation-capability information), method 400 moves from step 465 to step 470, where the first node processes the LDP message based on a local policy. For example, the local policy may instruct the first node to drop the LDP message if the attestation-capability information fails to satisfy a pre-determined attestation capability requirement. Method 400 then moves from step 470 to step 490, where method 400 ends.

If, at step 465, the first node determines that the attestation-capability information satisfies the pre-determined attestation capability requirement, method 400 moves from step 465 to step 475, where the first node determines whether the attestation token is valid for the second node at a current time. If the first node determines that the attestation token is not valid for the second node (or if the LDP message does not include an attestation token), method 400 moves from step 475 back to step 470, where the first node processes the LDP message based on a local policy. For example, the local policy may instruct the first node to drop the LDP message if the second attestation token is invalid for the second node at the current time. Method 400 then moves from step 470 to step 490, where method 400 ends.

If, at step 475, the first node determines that the attestation token is valid for the second node, method 400 moves from step 475 to step 480, where the first node determines whether a security level received from the second node satisfies a predetermined threshold. If the first node determines that the security level does not satisfy the predetermined threshold (or if the LDP message does not include a security level), method 400 moves from step 475 back to step 470, where the first node processes the LDP message based on a local policy. For example, the local policy may instruct the first node to drop the LDP message if the security level does not satisfy the predetermined threshold. Method 400 then moves from step 420 to step 490, where method 400 ends.

If, at step 480, the first node determines that the security level satisfies the predetermined threshold, method 400 moves from step 480 to step 485, where the first node establishes an MLDP adjacency to the second node. Once MLDP adjacency is established, the second node becomes part of the multicast tree. Method 400 then moves from step 485 to step 490, where method 400 ends. Particular embodiments may repeat one or more steps of the method of FIG. 4, where appropriate.

Although this disclosure describes and illustrates particular steps of the method of FIG. 4B as occurring in a particular order, this disclosure contemplates any suitable steps of the method of FIG. 4B occurring in any suitable order. Moreover, although this disclosure describes and illustrates an example method for validating a node with an attestation token in a network supporting a trusted MLDP routing protocol including the particular steps of the method of FIG. 4B, this disclosure contemplates any suitable method for validating a node with an attestation token in a network supporting a trusted MLDP routing protocol including any suitable steps, which may include all, some, or none of the steps of the method of FIG. 4B, where appropriate. Furthermore, although this disclosure describes and illustrates particular components, devices, or systems carrying out particular steps of the method of FIG. 4B, this disclosure contemplates any suitable combination of any suitable components, devices, or systems carrying out any suitable steps of the method of FIG. 4B.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A first network apparatus, comprising:
one or more processors; and
one or more computer-readable non-transitory storage media coupled to the one or more processors and comprising instructions that, when executed by the one or more processors, cause the first network apparatus to perform operations comprising:
   receiving, from a second network apparatus, a first multicast message comprising:
      attestation-capability information associated with the second network apparatus, wherein the attestation-capability information is any information that indicates whether a particular network node is capable of supporting attestation procedures in a multicast routing protocol; and
      an attestation token, wherein the attestation token is for proving that the second network apparatus is in a known safe state;
   determining that the attestation-capability information satisfies a pre-determined attestation capability requirement;
   forwarding the attestation token and an identity of the second network apparatus to a third-party verifier;
   receiving a response comprising a confirmation that the attestation token is valid for the second network apparatus at a current time;
   determining that the attestation token is valid for the second network apparatus at the current time; and
   establishing an adjacency to the second network apparatus.

2. The first network apparatus of claim 1, wherein the first multicast message is one of the following:
a Protocol-Independent Multicast (PIM) hello message; or
a Label Distribution Protocol (LDP) message.

3. The first network apparatus of claim 1, the operations further comprising:
receiving, from a third network apparatus, a second multicast message comprising attestation-capability information associated with the third network apparatus;
determining that the attestation-capability information fails to satisfy the pre-determined attestation capability requirement; and
dropping a multicast message originated from the third network apparatus.

4. The first network apparatus of claim 1, the operations further comprising determining that a security level associated with the second network apparatus satisfies a pre-determined security level threshold, wherein the first multicast message comprises the security level.

5. The first network apparatus of claim 1,
wherein the third-party verifier is determined to be trustworthy.

6. The first network apparatus of claim 1, the operations further comprising:
receiving, from a third network apparatus, a second multicast message comprising a second attestation token, wherein the second attestation token is for proving that the third network apparatus is in a known safe state;
determining that the second attestation token is invalid for the third network apparatus at a current time; and
processing the second multicast message based on a local policy.

7. The first network apparatus of claim 6, wherein the local policy instructs the first network apparatus to drop the second multicast message if the second attestation token is invalid for the third network apparatus at the current time.

8. A method, comprising:
receiving, by a first network apparatus, a first multicast message from a second network apparatus, the first multicast message comprising:
   attestation-capability information associated with the second network apparatus, wherein the attestation-capability information is any information that indicates whether a particular network node is capable of supporting attestation procedures in a multicast routing protocol; and
   an attestation token, wherein the attestation token is for proving that the second network apparatus is in a known safe state;
determining, by the first network apparatus, that the attestation-capability information satisfies a pre-determined attestation capability requirement;
forwarding the attestation token and an identity of the second network apparatus to a third-party verifier;
receiving a response comprising a confirmation that the attestation token is valid for the second network apparatus at a current time;
determining, by the first network apparatus, that the attestation token is valid for the second network apparatus at the current time; and
establishing, by the first network apparatus, an adjacency to the second network apparatus.

9. The method of claim 8, wherein the first multicast message is one of the following:
a Protocol-Independent Multicast (PIM) hello message; or
a Label Distribution Protocol (LDP) message.

10. The method of claim 8, further comprising:
receiving, from a third network apparatus, a second multicast message comprising attestation-capability information associated with the third network apparatus;
determining that the attestation-capability information fails to satisfy the pre-determined attestation capability requirement; and
dropping any multicast message originated from the third network apparatus.

11. The method of claim 8, further comprising determining that a security level associated with the second network apparatus satisfies a pre-determined security level threshold, wherein the first multicast message comprises the security level.

12. The method of claim 8,
wherein the third-party verifier is determined to be trustworthy.

13. The method of claim 8, further comprising:
receiving, from the first network apparatus, a second multicast message from a third network apparatus, the second multicast message comprising a second attestation token, wherein the second attestation token is for proving that the third network apparatus is in a known safe state;
determining, by the first network apparatus, that the second attestation token is invalid for the third network apparatus at a current time; and processing, by the first network apparatus, the second multicast message based on a local policy.

14. The method of claim 13, wherein the local policy instructs the first network apparatus to drop the second multicast message if the second attestation token is invalid for the third network apparatus at the current time.

15. One or more computer-readable non-transitory storage media embodying instructions that, when executed by a processor, cause the processor to perform operations comprising:
- receiving, by a first network apparatus, a first multicast message from a second network apparatus, the first multicast message comprising:
  - attestation-capability information associated with the second network apparatus, wherein the attestation-capability information is any information that indicates whether a particular network node is capable of supporting attestation procedures in a multicast routing protocol; and
  - an attestation token, wherein the attestation token is for proving that the second network apparatus is in a known safe state;
- determining, by the first network apparatus, that the attestation-capability information satisfies a pre-determined attestation capability requirement;
- forwarding the attestation token and an identity of the second network apparatus to a third-party verifier;
- receiving a response comprising a confirmation that the attestation token is valid for the second network apparatus at a current time;
- determining, by the first network apparatus, that the attestation token is valid for the second network apparatus at the current time; and
- establishing, by the first network apparatus, an adjacency to the second network apparatus.

16. The one or more computer-readable non-transitory storage media of claim 15, wherein the first multicast message is one of the following:
- a Protocol-Independent Multicast (PIM) hello message; or
- a Label Distribution Protocol (LDP) message.

17. The one or more computer-readable non-transitory storage media of claim 15, the operations further comprising:
- receiving, from a third network apparatus, a second multicast message comprising attestation-capability information associated with the third network apparatus;
- determining that the attestation-capability information fails to satisfy the pre-determined attestation capability requirement; and
- dropping any multicast message originated from the third network apparatus.

18. The one or more computer-readable non-transitory storage media of claim 15, the operations further comprising determining that a security level associated with the second network apparatus satisfies a pre-determined security level threshold, wherein the first multicast message comprises the security level.

19. The one or more computer-readable non-transitory storage media of claim 15,
wherein the third-party verifier is determined to be trustworthy.

20. The one or more computer-readable non-transitory storage media of claim 15, the operations further comprising:
- receiving, from the first network apparatus, a second multicast message from a third network apparatus, the second multicast message comprising a second attestation token, wherein the second attestation token is for proving that the third network apparatus is in a known safe state;
- determining, by the first network apparatus, that the second attestation token is invalid for the third network apparatus at a current time; and
- processing, by the first network apparatus, the second multicast message based on a local policy.

* * * * *